Sept. 22, 1936.  G. O. GRIDLEY ET AL  2,055,436
INDEXING STATION TYPE MACHINE
Original Filed July 16, 1931   4 Sheets-Sheet 1

INVENTORS
George O. Gridley
Donald H. Montgomery
Earl Hinkel
Mitchell Bechert
ATTORNEYS.

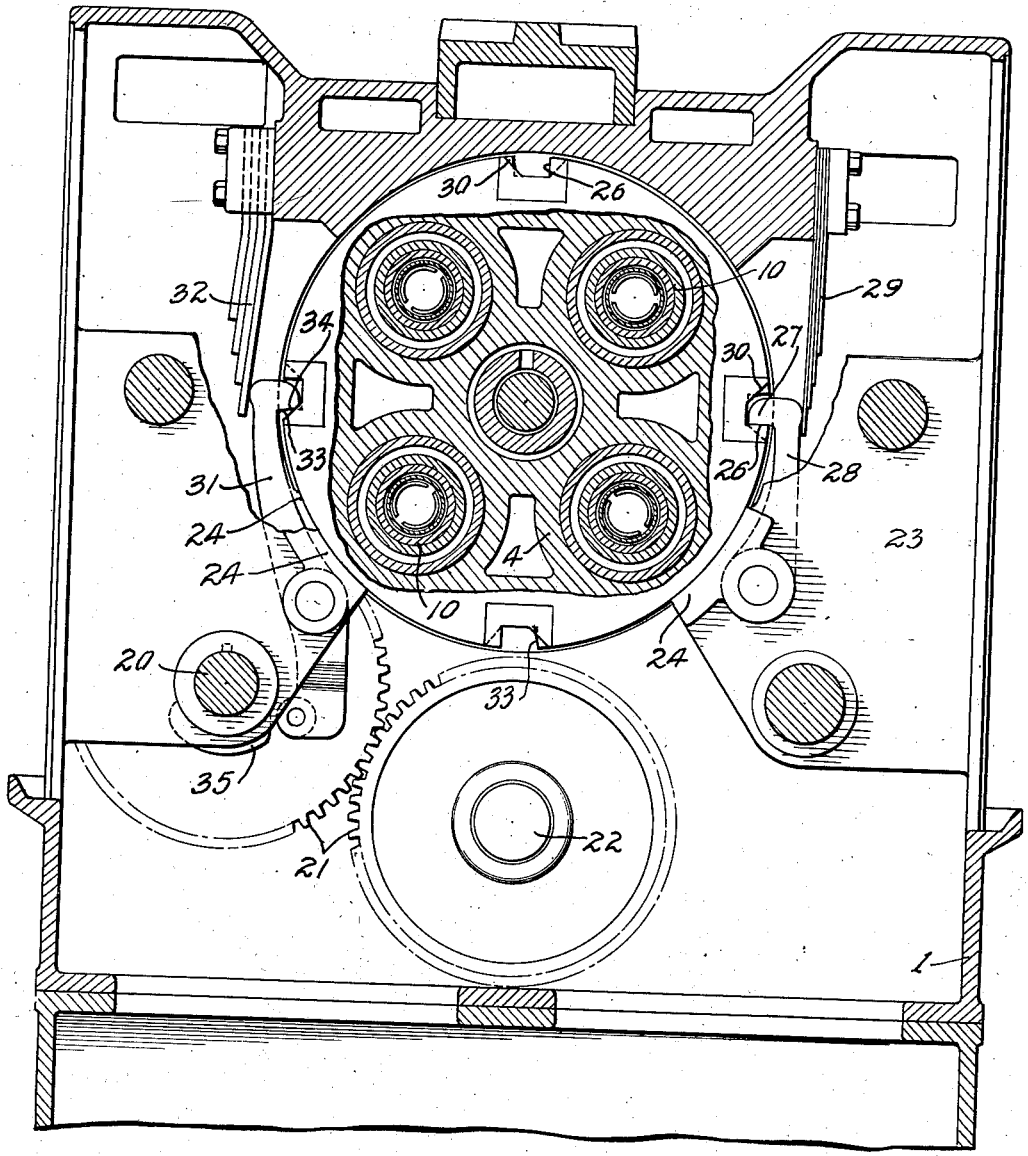

Patented Sept. 22, 1936

2,055,436

UNITED STATES PATENT OFFICE 2,055,436

INDEXING STATION TYPE MACHINE

George O. Gridley, New Britain, Donald H. Montgomery, Berlin, and Earl H. Wheeler, Hartford, Conn., assignors, by mesne assignments, to The New Britain Machine Company, New Britain, Conn., a corporation of Connecticut Original application July 16, 1931, Serial No. 551,136. Divided and this application August 21, 1934, Serial No. 740,780, and in Great Britain October 5, 1931

12 Claims. (Cl. 29—38)

Our invention relates to an indexing type of machine and more particularly to a type of machine such as a multiple spindle screw machine or chucking machine. This application is a division of application Serial No. 551,136, filed July 16, 1931. In application Serial No. 394,232, filed September 21, 1929, we have disclosed and broadly claimed an indexable carrier, together with means for supporting the carrier out of bearing supporting engagement with the frame of the machine during indexing and moving the carrier into bearing supporting engagement with the frame between indexing movements of the carrier. The present invention relates to the same general type of machine and turret or spindle carrier supporting means.

It is the principal object of the present invention to provide improved spindle carrier or turret supporting means in which wear incident to indexing is practically eliminated and indexing greatly facilitated, and which is susceptible of embodiment in practically all machines of the indexing station type.

In the drawings which show, for illustrative purposes only, a preferred form of the invention as embodied in a multiple spindle bar or chucking machine—

Fig. 6 is a sectional view taken substantially in the plane of the line 6—6 of Fig. 3, but for the sake of illustration showing spindle carrier supports positioned in front of the section plane, parts being broken away.

Figure 1:
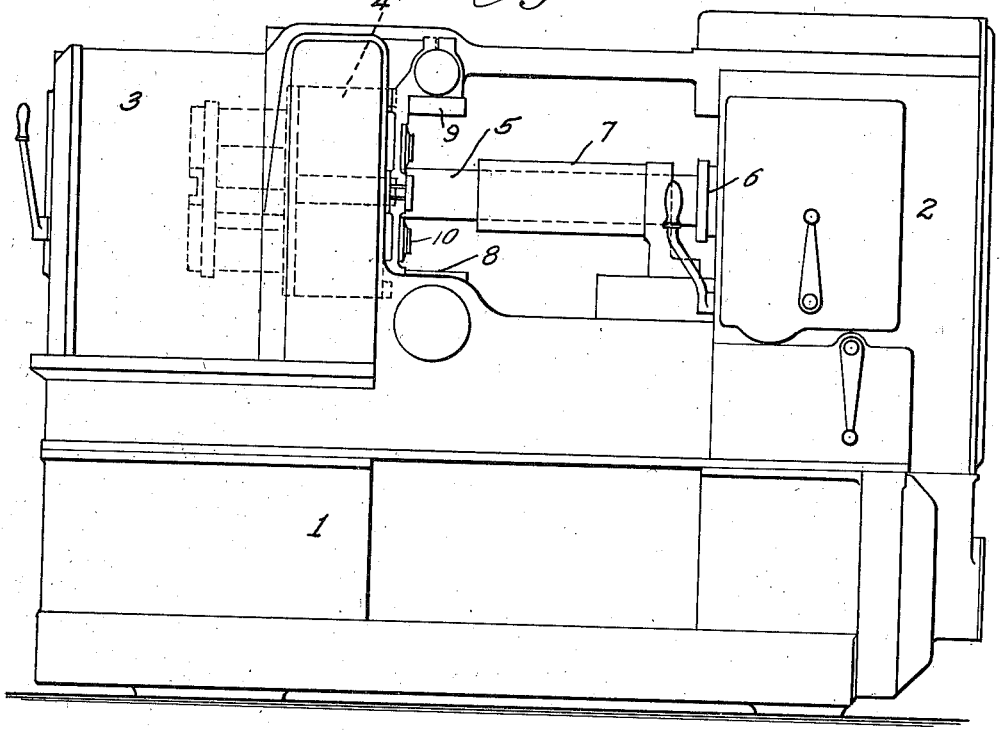
Fig. 1 is a view in front elevation of a machine in which the invention may be embodied.
Figure 2:
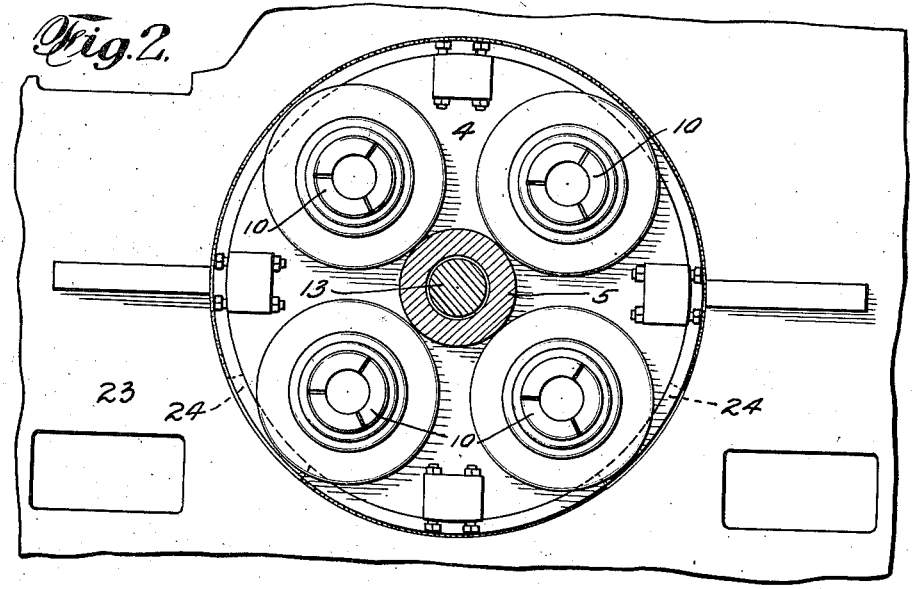
Fig. 2 is an enlarged view in front elevation of the spindle carrier and adjacent parts of the machine shown in Fig. 1.

In said drawings, 1 indicates generally a main frame of a multiple spindle bar machine. The machine may comprise a power case 2 and opposite thereto the spindle carrier end 3 of the machine. A spindle carrier 4 is located in the spindle carrier end of the machine and in the form shown is provided with a stem 5 rotatably secured in a substantial thrust bearing 6 in the power case of the machine. The thrust bearing 6 prevents endwise movement of the stem 5 and spindle carrier 4 and takes the tool thrusts. A tool slide 7 is movable on the stem 5 and may carry end working tools while forming tools may be carried on tool slides 8—9.

The spindle carrier 4 in the form shown carries four rotatable spindles 10—10. The spindles are driven by a central drive gear 11 meshing with individual spindle drive gears 12—12 and itself driven by a shaft 13 passing through the stem 5 and driven through suitable gearing in the power case. The spindle carrier may be formed in part on a plate 14 secured to the rear thereof and provided with webs 15 carrying an index plate 16 provided with the usual index slots 17—17. An index arm 18 carrying a roll 19 for engagement with the slots 17 for indexing the spindle carrier is driven through spur gears by a cam shaft 20 which may in turn be driven through spur gears 21 from the main cam shaft 22 of the machine.

Between indexing movements of the spindle carrier, the latter is rigidly supported from the frame. In the form shown the frame has webs 23—23 which support the spindle carrier. As illustrated, the supporting means for the spindle carrier are in the form of spaced supports 24—24 carried by the webs so as to engage the spindle carrier circumferentially and support the same at the front and rear.

In order to securely hold the spindle carrier in bearing supporting engagement with the frame supports 24—24, the spindle carrier, in the form illustrated, is provided with four equidistantly spaced locking slots, and the corresponding side 26 of each slot extends preferably radially of the spindle carrier and is adapted to be engaged by a radial surface on the nose 27 of a locking arm 28 carried by the frame or one of the webs heretofore noted. The locking arm 28 is urged inwardly by a spring 29. The top of the nose 27 is rounded and the edge of the slot opposite the radial side 26 is inclined as indicated at 30 so that upon indexing of the carrier in a clockwise direction the camming edge 30 will cam out the locking arm and permit the nose to ride on the periphery of the carrier until the next succeeding locking slot comes into position when the nose 27 will snap into the slot. The carrier is also provided with a second set of locking slots to be engaged by a locking arm 31 pivoted to the frame or frame web, as shown particularly in Fig. 6, and urged inwardly by a heavy spring 32. Each corresponding edge 33 of the locking slots for the arm 31 is inclined and the engaging edge 34 of the nose of the arm 31 is also inclined so that when the nose of the arm 31 is forced inwardly by the heavy spring 32 the spindle carrier will be cammed or forced downwardly into bearing supporting engagement with the frame. It will be observed that with the locking arm 28 in the locking position shown in Fig. 6, the nose of the arm 31 with its inclined surface very forcibly cams the spindle carrier down. As stated, the locking arm 28, urged inwardly by the relatively light spring 29, may be simply cammed out of the locking slot by the indexing carrier, whereas the locking arm 31 being urged inwardly by the very heavy plate spring is moved out of its slots by means of a cam 35 on or driven in synchronism with the index shaft 20. In the position shown in Fig. 6, the cam 35 has just released the lower end of the pivoted locking arm 31 and the spring 32 has forced the nose of the arm 31 into the proper locking slot so as to lock the spindle carrier against rotation. When the spindle carrier is cammed downwardly by the locking arms, as described, it is very forcibly urged into bearing supporting relation with the frame.

Figure 3:
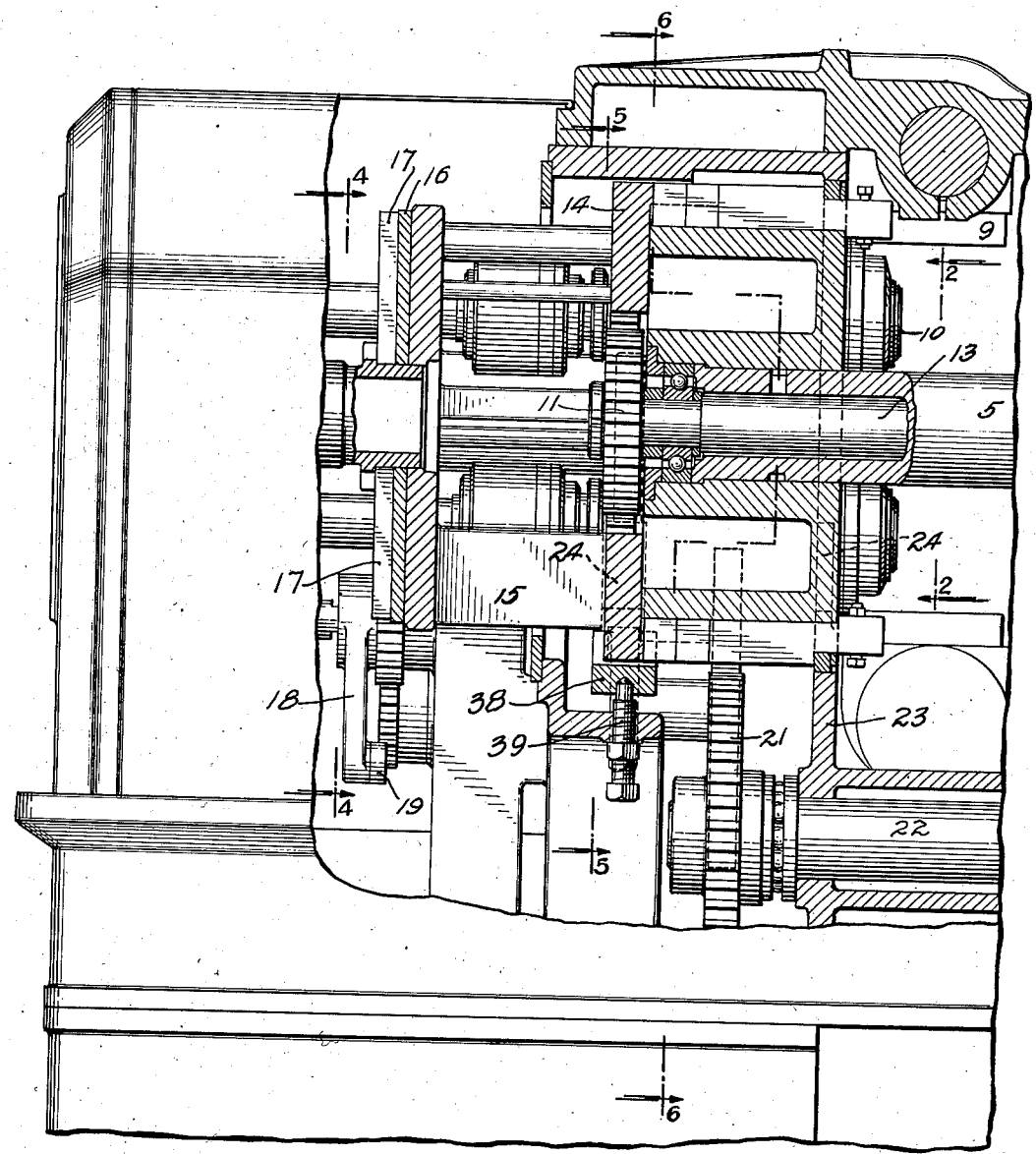
Fig. 3 is an enlarged substantially central vertical sectional view of the spindle carrier and adjacent parts and illustrating features of the invention.
Figure 4:
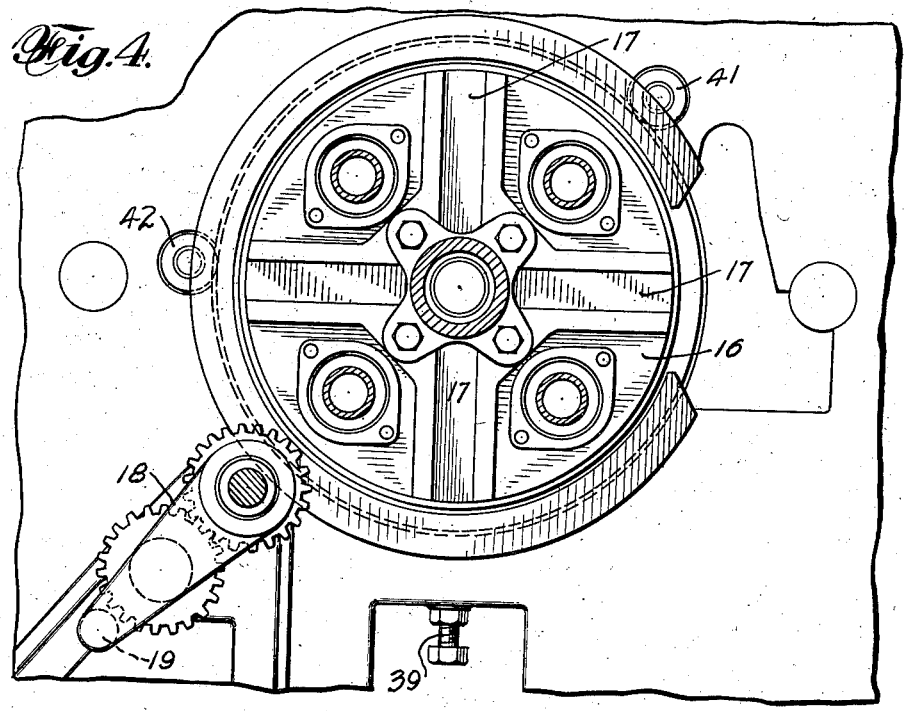
Fig. 4 is a sectional view taken substantially in the plane of the line 4—4 of Fig. 3.
Figure 5:
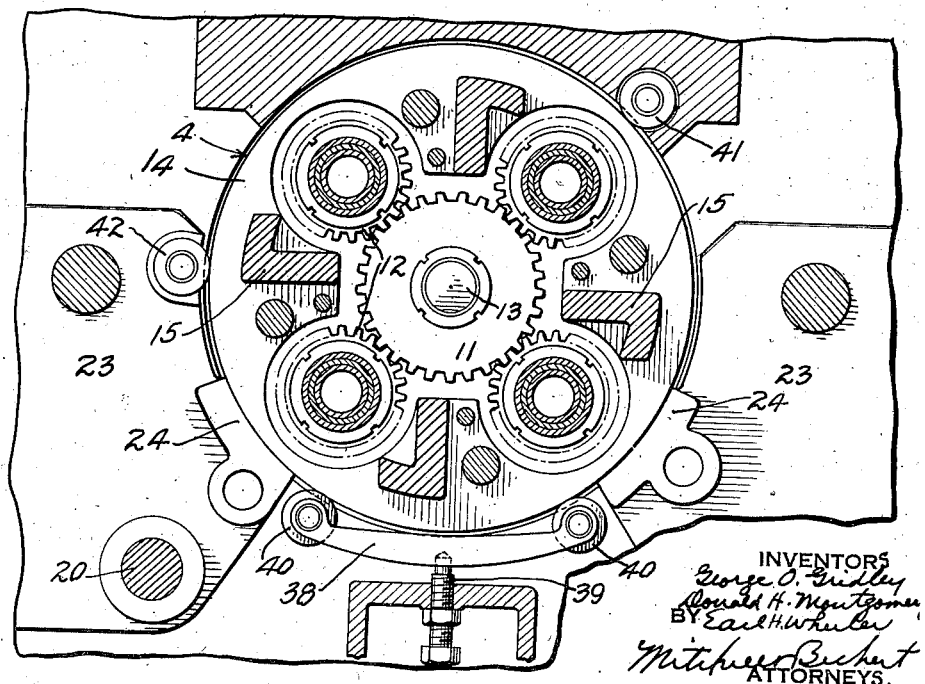
Fig. 5 is a sectional view taken substantially in the plane of the line 5—5 of Fig. 3.

In order to maintain the original accuracy of alignment of the parts by preventing wear on the frame support for the spindle carrier and on the spindle carrier itself, we provide for moving the frame support and spindle carrier relatively to each other in a direction transverse to the axis of indexing so as to separate the same during indexing movement. By so doing, the spindle carrier is indexed while out of bearing supporting engagement with the frame supports 24—24 and the latter serve merely as supports for the carrier between indexes and not as rotating bearings therefor during indexing. In the form shown, we raise the spindle carrier out of bearing supporting engagement with the supports 24—24 by means engaging directly beneath the spindle carrier itself. The particular means employed is in the form of a spring saddle comprising the relatively heavy spring member 38 adjustably held on the frame by means of an adjusting screw 39 as shown particularly in Figs. 3 and 5. The spring saddle member 38 may carry rollers 40—40 to engage the spindle carrier about its circumference at the underneath portion thereof. The strength of the spring 38 and the adjustment thereof by means of the adjusting screw 39 are such that when the spindle carrier is freed by the locking arms 28—31, the spindle carrier will be moved up out of bearing supporting engagement with the frame supports 24—24 and will be supported by the spring saddle construction during indexing. As soon as the spindle carrier has been indexed the locking arm 28 will snap into place, as heretofore described, and the cam 35 will release the locking arm 31, which, under the influence of the heavy spring 32, will cam the spindle carrier down into bearing supporting engagement with the frame supports 24—24, the spring saddle device meanwhile yielding to the superior force of the locking arms.

If desired, we may provide means in addition to the spring saddle device 38—40 for sustaining the spindle carrier during indexing. In the form shown, we employ rollers 41—42 rotatably secured to the frame and positioned to engage the spindle carrier when it is forced up by the spring saddle device. It may be noted that it is only necessary to move the spindle carrier up a few thousandths of an inch or just sufficient to prevent the spindle carrier from wearing the bearing supports during indexing. The roller 42 is preferably positioned about diametrically opposite the nose 27 of the locking arm 28 so as to prevent the locking arm 28 which rides circumferentially on the spindle carrier during indexing from forcing the spindle carrier out of line or toward the left as viewed in Fig. 5. With the roller device illustrated, the spindle carrier will be substantially anti-frictionally supported during indexing and indexing will thus be greatly facilitated and in addition the wear of the spindle carrier and of the bearing supports 24—24 will be negligible.

While the invention has been described in considerable detail and as embodied in a bar or chucking machine, it is to be observed that the invention is applicable to other indexing types of machine and that various changes may be made within the scope of the invention as defined in the appended claims.

We claim:
1. In a machine of the character indicated, a frame, an indexable carrier, means acting in a direction transversely of the axis of indexing of said carrier and positioned beneath said carrier for supporting the latter out of bearing supporting engagement with said frame during indexing movements of said carrier, and means for forcing said carrier into bearing supporting engagement with said frame between indexing movements of said carrier.

2. In a machine of the character indicated, a frame, an indexable carrier, said frame and carrier being movable relatively to each other in a direction transverse to the axis of indexing of said carrier into and out of bearing supporting engagement with each other, means for forcing said frame and carrier into bearing supporting engagement with each other between indexing movements of said carrier, and means extending beneath said carrier for supporting said carrier when freed from said frame during indexing movements of said carrier.

3. In a machine of the character indicated, a frame, a carrier indexable about a horizontal axis, means for clamping said carrier in bearing supporting engagement with said frame between indexing movements of said carrier, and means beneath said carrier for raising the same transversely of its axis of indexing and supporting the same out of bearing supporting engagement with said frame during indexing movements of said carrier.

4. In a machine of the character indicated, a frame having spaced apart supporting surfaces thereon, a spindle carrier in position to engage and be supported by said supporting surfaces, means for locking said spindle carrier against said supporting surfaces, and a resilient device eccentric of said carrier for moving the latter out of engagement with said supporting surfaces during indexing movement of said spindle carrier.

5. In a machine of the character indicated, a spindle carrier, a stem rigidly carried thereby and supported from said frame against endwise movement, means for drawing said spindle carrier down into engagement with supporting surfaces on said frame, and a spring saddle beneath said spindle carrier for raising the latter out of engagement with said supporting surfaces during indexing movement of said spindle carrier.

6. In a machine of the character indicated, a generally cylindrical spindle carrier, a frame, and spaced roller means carried by said frame for engaging beneath the cylindrical surface of and supporting said spindle carrier during indexing movements, and means for locking said carrier against rotative movement between indexing movements.

7. In a machine of the character indicated, a frame, a spindle carrier, a roller in position to engage said spindle carrier, and a spring pressed roller opposite said first mentioned roller and adapted to force said spindle carrier into engagement with said first mentioned roller whereby during indexing movement said spindle carrier will be supported by said rollers.

8. In a machine of the character indicated, a frame, a spindle carrier therein, a spring saddle device including rollers for raising and supporting said spindle carrier during indexing movements thereof, and means for drawing said spindle carrier down into engagement with said frame between indexing movements.

9. In a machine of the character indicated, an indexable carrier, supporting means engaging said carrier circumferentially for supporting said carrier during indexing movements of said carrier, supporting means for said carrier between indexing movements of said carrier, and means for moving said carrier and one of said supporting means relatively to each other for the purpose described.

10. In a machine of the character indicated, a work carrier, means for indexing the same, resilient means to engage the latter circumferentially and resiliently support the same during indexing movement thereof, and means for forcing said carrier into engagement with said frame between indexing movements.

11. In a machine of the character indicated, a work carrier, a resilient saddle carrying rollers positioned beneath said carrier, means for loading said resilient saddle whereby said resilient saddle may resiliently raise said carrier and support the same during indexing movement, and means for drawing said carrier down into engagement with supporting portions of said frame between indexing movements and against the force exerted by said resilient saddle.

12. In a machine of the character indicated, a frame, an indexable carrier, means engaging beneath said carrier for raising and supporting the latter out of bearing supporting engagement with said frame during indexing movements thereof, means on said frame and spaced circumferentially from said supporting means and positioned to locate and sustain said carrier against tipping on said supporting means during indexing, and means for locking said carrier in bearing supporting engagement with said frame between indexing movements of said carrier.

GEORGE O. GRIDLEY.
DONALD H. MONTGOMERY.
EARL H. WHEELER.